Dec. 26, 1967  J. J. PORADA  3,359,925
METHOD AND APPARATUS FOR FORMING AN EDIBLE PRODUCT
Filed Sept. 1, 1965
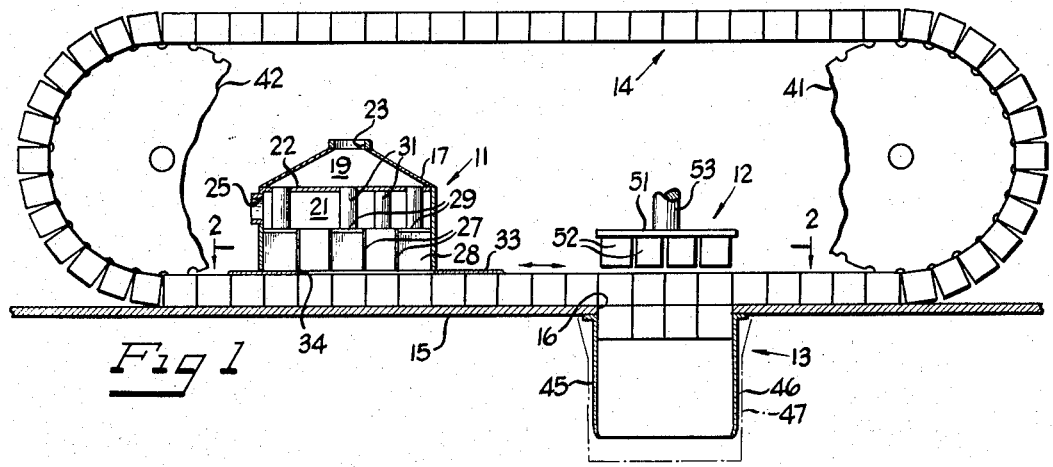
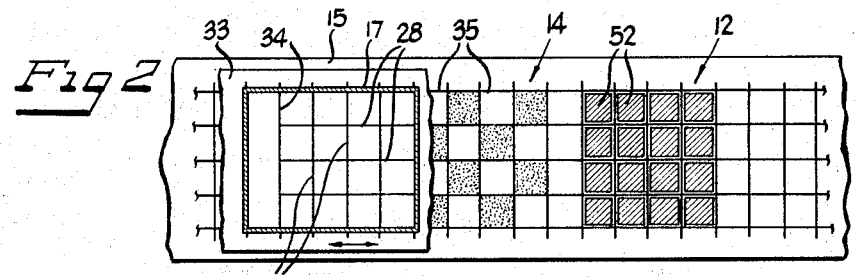
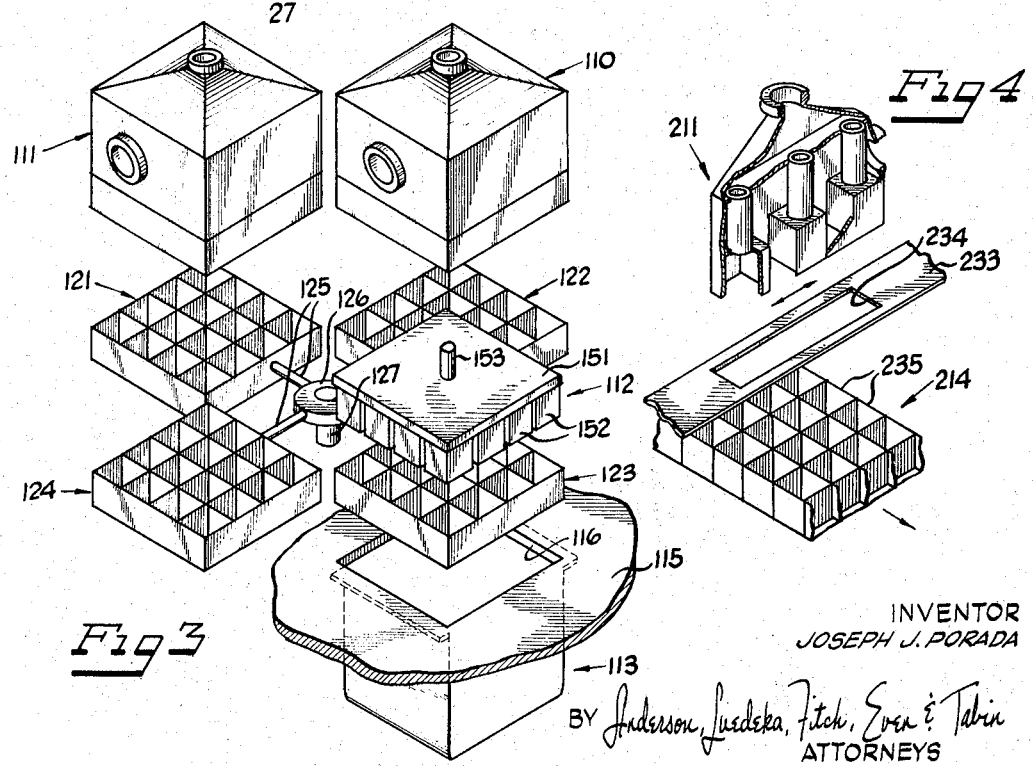
INVENTOR
JOSEPH J. PORADA
BY Anderson, Luedeka, Fitch, Even & Tabin
ATTORNEYS

United States Patent Office 3,359,925
Patented Dec. 26, 1967

3,359,925
METHOD AND APPARATUS FOR FORMING AN EDIBLE PRODUCT
Joseph J. Porada, Norridge, Ill., assignor to National Dairy Products Corporation, New York, N.Y., a corporation of Delaware
Filed Sept. 1, 1965, Ser. No. 484,243
12 Claims. (Cl. 107—1)

ABSTRACT OF THE DISCLOSURE

A method and apparatus for forming an edible product in the form of a block comprised of a plurality of sections of different plastic materials arranged in layers, the layers being formed individually by filling a plurality of adjacent molds and, after formation, being transferred to a different location where they are stacked one on top of another to form the final product.

This invention relates to the manufacture of edible products comprised of materials such as ice cream, ice milk, sherbet, cheese, etc. More particularly, the invention relates to the forming of an edible product in a block comprised of a plurality of sections of different plastic materials arranged in layers, with adjacent sections in each layer and adjacent sections in adjacent layers being of different materials. The block thus formed may be, for example, a block of ice cream comprised of a plurality of sections of two different flavors arranged such that the block may be sliced with the resulting surfaces at the slice having a checkerboard pattern.

In co-pending application Ser. No. 337,991, filed Jan. 13, 1964, now Patent No. 3,295,466, and assigned to the assignee of the present invention, such a product and the apparatus for making the product are shown and described. The said application describes a header which extrudes the ice cream through a plurality of orifices arranged in a checkerboard pattern. The header reciprocates with respect to a plurality of forming nozzles feeding the ice cream into a package in order to produce a block having alternating patterns of sections of different materials in all three dimensions.

Such apparatus has found considerable success in actual commercial use. Nevertheless, it is desirable to discover alternate ways of accomplishing the manufacture of such a product. Such alternate ways may provide superior operation under certain circumstances, and may provide advantages in cost, size, or production rates.

Accordingly, it is an object of this invention to provide an alternative to the ice cream forming machine disclosed in patent application Ser. No. 337,991, now Patent No. 3,295,466.

Another object of the invention is to provide improved apparatus for forming a product of the type described.

Still another object is to provide apparatus for forming a product of the type described and which lends itself to relatively high rates of production.

Other objects of the invention and the advantages thereof will become apparent from the following description taken in connection with the accompanying drawings wherein:

FIGURE 1 is an elevational full section view of apparatus constructed in accordance with the invention;

FIGURE 2 is a sectional view taken along the line 2—2 of FIGURE 1;

FIGURE 3 is an exploded perspective view of an alternative embodiment of the invention; and FIGURE 4 is an exploded perspective view of a still further embodiment of the invention.

In accordance with the invention, an edible product is formed into a block comprised of a plurality of sections of different plastic materials arranged in layers. The various layers are individually formed and are comprised of sections of different plastic materials. Each layer thus formed is then transported to a position remote from where it is formed. At the remote position, the layers are stacked to form the block independently of the forming of the layers. Each layer may be formed and oriented with respect to the other layers such that adjacent sections in each layer and adjacent sections in adjacent layers are of different materials.

Referring more particularly to FIGURES 1 and 2, apparatus constructed in accordance with the invention is shown. The apparatus comprises a header 11, an ejecting device 12, a filling structure 13, and an endless belt 14 comprised of forming nozzles. Header 11 and ejecting device 12 are supported by suitable means, not shown, on a platform 15. Filling structure 13 is also supported at an opening 16 in platform 15. The apparatus shown is for forming an ice cream product but it will be understood that products of materials other than ice cream, such as ice milk, sherbet, cheese, etc., could be used in connection with the invention. Furthermore, although the apparatus shown herein will be described in connection with forming checkerboard patterned ice cream, sequential patterns other than the checkerboard patterns, of three or more colors or flavors, could be formed in apparatus constructed in accordance with the teaching of this specification.

Header 11 operates to extrude a supply of material at desired places into the forming nozzles in endless belt 14 for forming patterned layers and is comprised of a housing 17 which is divided into a pair of chambers 19 and 21 by a wall 22. A feed orifice 23 is provided in housing 17 for feeding material into chamber 19 under pressure. A similar feed orifice 25 is provided in housing 17 for feeding a dissimilar material into chamber 21 under pressure. In the manufacture of an ice cream product, the dissimilar materials can be of different colors and/or flavors, such as chocolate and vanilla. The lower portion of housing 17 is divided by a plurality of mutually parallel walls 27 and a further plurality of transverse intersecting mutually parallel walls 28 into a plurality of elongated channels of rectangular cross section. The lower ends of the channels defined by walls 27 and 28 defined adjacent coplanar orifices arranged in two sets of mutually parallel rows extending in two perpendicular directions, respectively, in the plane in which they lie.

Alternate ones of the channels defined by walls 27 and 28 in each of the rows in which the channels are arranged are closed by a top wall 29. Those channels which are closed by a top wall 29 are in fluid communication with chamber 19 and are excluded from communication with chamber 21 by means of connecting tubes 31. Those channels which are not closed at their top by top walls 29 open into chamber 21. It will therefore be seen that one type of material, for example vanilla ice cream may be fed into chamber 19 under pressure through orifice 23 and from chamber 19 through tubes 31 into the channels which are covered by the top walls 29.

Similarly, material fed through orifice 25 into chamber 21 which is different from the material fed into chamber 19, for example chocolate ice cream, will flow into the channels in communication with chamber 21.

A transversely slidable plate 33 is disposed between header 11 and the endless conveyor 14. Plate 33 has an opening 34 therein which is of a size such that plate 33 will block one of two outside rows of the nozzles in the header 11 extending transversely of the direction of movement of the plate 33. Plate 33 is reciprocated by suitable means, not shown, to block an alternate one of the outside two rows of nozzles in header 11 for each successive layer formed. This means that ice cream will be forced or extruded through only four of the five rows of nozzles extending transversely of the direction of movement of plate 33.

Endless belt 14 is comprised of a plurality of banks or rows 35 of forming nozzles or molds extending transversely of the belt. The nozzles of each bank are of the same size and shape cross section as the orifices in header 11 (although such need not necessarily be the case), and are shaped to form the material into a desired shape. Each bank or row 35 of nozzles is flexibly secured to the adjacent bank to form the endless belt, which slides along platform 15 between header 11 and filling device 13. The endless belt 14 is driven by a pair of wheels 41 and 42 which frictionally engage the endless belt 14 and are driven by a motor (not shown).

The filling device 13 is secured at an opening 16 in support plate 15, and comprises a downwardly extending chute 45 which is adapted to be inserted into a cardboard carton, indicated in phantom by line 47, for packaging the final ice cream product.

The ejecting device 12 comprises a plate 51 from which extends a plurality of plungers 52 corresponding in shape and number to the segments of ice cream in each layer. Plate 51 is connected by a drive rod 53 to a suitable actuating mechanism, not shown.

By the arrangement of the channels in the header 11 and their appropriate communication with the respective chambers 19 and 21, the materials are extruded through the orifices of the channels in a layer having a checkerboard pattern. In order to provide adjacent sections in adjacent layers of differential material, the method and apparatus of the invention operates such that each successive layer formed is of the necessary pattern of sections when it is stacked.

More particularly, header 11 operates to fill the nozzles of endless conveyor 14 underneath the header such that a layer is formed. The layer formed by header 11 is then transported by the moving conveyor to a position over opening 16. Ejecting device 12 then moves down such that plungers 52 force the entire layer out of the nozzles of the endless conveyor 14 and downwardly through the chute 45 of filling device 13. At the same time, header 11 operates to fill another group of nozzles to form another layer. Plate 33 operates such that each succeeding layer formed has a different pattern from that of the previously formed layer.

Because each layer is formed a different distance from opening 16, due to the action of plate 33, it is necessary that endless belt 14 be stepped a distance different from the immediately preceding distance moved each time a layer is ejected. In the apparatus of FIGURES 1 and 2, it is necessary to move the endless belt 14 through a distance equal to nine banks of nozzles until the furthest right bank of nozzles under header 11, as shown, is aligned along the right hand edge of opening 16. Because plate 33 then shifts to the left to block the furthest right hand row of channels in header 11 and to open the furthest left hand row, it is necessary to move the endless belt 14 through a distance equal to ten banks until the layer thus formed is properly aligned with opening 16. This procedure continues until a desired number of layers are formed and inserted into the carton, whereupon the full carton is removed and replaced by an empty one. The alternate advance of the belt through first a distance of nine banks and then ten banks is effective through a suitable, well-known indexing mechanism (not shown) provided for this purpose.

Referring now to FIGURE 3, a further embodiment of the invention is shown. In this embodiment, as was the case in the embodiment of FIGURES 1 and 2, a two flavor/color checkerboard pattern is formed by first forming the layers and then transporting them to a remote position for stacking. In the embodiment of FIGURE 3, however, layers are transported through a circular path and are rotated in their orientation with respect to the position in which they are formed. Two headers 111 and 110 are provided. Headers 110 and 111 are similar in construction to header 11 in FIGURES 1 and 2, but have the same number of channels as there are sections in each layer, rather than having one more row of channels as was the case in the header 11 of FIGURES 1 and 2. Headers 110 and 111 are square and are aligned with two of four groups 121, 122, 123 and 124 of nozzles. Each group is comprised of four banks of nozzles, and each bank of nozzles has four nozzles. Although other numbers of banks and nozzles may be used, it is necessary that there be an even number of banks and of nozzles in each bank, and it is necessary that the groups be square. Groups 121–124 are each secured by one of arms 125 and a support cylinder 126 to a drive shaft 127. Arms 125 extend perpendicularly of the axis of shaft 127 at 90° intervals. Shaft 127 is rotatable by suitable means, not shown through four indexed positions at 90° intervals.

In forming the product, header 11 fills the group 121 of nozzles and header 110 fills the group 122 of nozzles to form two complete layers. The patterned layers formed by the headers are identical. Shaft 127 is then rotated 90° to bring group 122 into the position above opening 116 in platform 115. Ejecting device 112, which is similar to ejecting device 12 in FIGURES 1 and 2, then moves down to force the ice cream from the group of nozzles 122 and into the filling device 113, which is identical to filling device 13 in FIGURE 1. Ejecting device 112 is then raised and shaft 127 is rotated 90° more to bring group 121 of nozzles into alignment with opening 116 and filling device 113. The ice cream is then ejected from group 121 by ejecting device 112. It will be noted that because group 122 is moved through only 90° of shaft rotation prior to ejection whereas group 121 is moved through 180° of shaft rotation prior to ejection, group 121 will have been rotated 90° with respect to group 122. Accordingly, adjacent sections in adjacent layers will be of different materials.

Simultaneously, with the ejection of materials from group 121, group 124 will be aligned with header 110 and group 123 will be aligned with header 111. Groups 123 and 124 are filled in this position at the same time material from group 121 is being ejected. The next two 90° indexed positions of shaft 127 will eject material from group 124 and then group 123 to form layers in the same manner as groups 121 and 122. At the time material is ejected from group 123, groups 121 and 122 may be filled. Thus, at each 90° indexed position of shaft 127, ejecting device 112 will eject a layer of material. At every other 90° indexed position of shaft 127, headers 110 and 111 operate to fill the particular group aligned therewith. Each layer is stacked upon the other after it has been rotated 90° with respect to the layer upon which it is stacked to thus cause adjacent sections of adjacent layers to be of different materials. Cartons, which may be placed on filling device 113, may be removed and replaced when the desired number of layers are stacked.

Referring to FIGURE 4, a still further embodiment of the invention is shown. The embodiment of FIGURE 4 is identical to that of FIGURES 1 and 2 except for the movement of endless belt 214 and the construction and operation of header 211. Header 211 is similar to header 11 in FIGURE 1, but has only a single row of channels and operates to fill only one bank of nozzles in endless belt 214 at a time, rather than a plurality of adjacent banks of nozzles as was the case in the embodiment of FIGURES 1 and 2. Plate 233 is stationary and the header 211 moves in reciprocal fashion. Plate 233 has an opening 234 therein which operates to alternately block the two outside channels of header 211 as it reciprocates transversely of the path of endless belt 214. Header 211 is provided with one more channel than there are nozzles in each bank 235 in endless belt 214. Endless belt 214, through suitable, well-known indexing mechanism (not shown), moves in increments corresponding to one of banks 235. The banks 235 are filled one at a time and adjacent nozzles in each bank and in adjacent banks are filled with dissimilar materials according to the reciprocating action of header 211. Every nozzle in the endless belt is thus filled so that, in effect, the various layers are formed end to end along the belt. The ejecting device and the filling device in the embodiment of FIGURE 4 are not shown, but may be identical to that shown in FIGURES 1 and 2 except that the ejecting device should eject material from an odd number of banks each time. The ejecting device 12 operates every fifth (or other odd number) step of endless belt 214 to eject an entire layer from the nozzles.

It may therefore be seen that the invention provides an improved method and apparatus for forming an edible product into a block comprised of a plurality of sections of different plastic materials arranged in layers, with adjacent sections in each layer and adjacent sections in adjacent layers being of different materials. The endless belt movement or continuous rotary movement of the banks of nozzles render the apparatus of the invention capable of high production rates. The apparatus has been described in connection with two different materials in perfect sequential arrangement in three dimensions. It will be apparent, however, that more than two flavors or arrangements, which are or are not perfectly sequential, could be formed in accordance with the invention. The resultant product could then be comprised of sections of three or more flavors and/or colors in sequential arrangements in all three dimensions. Other types of headers for filling the endless belt in a desired manner could be used in addition to the types illustrated. Various modifications and further embodiments of the invention, other than those shown and described herein, will be apparent to those skilled in the art from this specification and such other embodiments are intended to fall within the scope of the appendant claims.

I claim:

1. A method for forming an edible plastic product into a block comprised of a plurality of sections of different plastic materials arranged in layers, said method including the following steps: forming a plurality of layers comprised of sections of different plastic materials, transporting each layer thus formed to a position remote from where it is formed, and placing said layers in adjacent relation to form the block independently of forming said layers.

2. A method for forming an edible plastic product into a block comprised of a plurality of sections of different plastic materials arranged in layers, said method including the following steps: forming a plurality of layers comprised of sections of different plastic materials by filling a plurality of mutually adjacent forming molds, transporting each layer thus formed by transporting the molds to a position remote from where the layer is formed, and placing said layers in adjacent relation to form the block independently of forming said layers by ejecting the material from said molds.

3. A method for forming an edible product into a block comprised of a plurality of sections of different plastic materials arranged in layers, with adjacent sections in each layer and adjacent sections in adjacent layers being of different materials, said method including the following steps: forming a plurality of layers with each layer being comprised of sections such that adjacent sections are of different plastic materials, transporting each layer thus formed to a position remote from where it is formed, and stacking the layers at such remote position to form the block independently of forming such layers with each layer being oriented with respect to the other layers such that adjacent sections in adjacent layers are of different materials.

4. The method of claim 3 wherein each successive layer formed is transported over a different distance from where it is formed to where it is stacked.

5. A method for forming an edible product into a rectangular block comprised of a plurality of sections of two different plastic materials arranged in layers with adjacent sections in each layer and adjacent sections in adjacent layers being of different materials such that a checkerboard pattern exists in planes parallel to the various sides of the rectangular block, said method including the following steps: forming a plurality of layers with each layer being comprised of sections of the different plastic materials arranged in a checkerboard pattern, transporting each layer thus formed to a position remote from where it is formed, and stacking the layers at such remote position to form the block independently of forming said layers with each layer being oriented with respect to the other layers such that adjacent sections in adjacent layers are of different materials.

6. Apparatus for forming an edible product into a block comprised of a plurality of sections of different plastic materials arranged in layers, including in combination, means for forming a plurality of layers with each layer being comprised of sections of different materials, means for transporting each layer thus formed to a position remote from where it is formed, and means at such remote position for placing the layers adjacent each other to form the block independently of forming the layers.

7. Apparatus for forming an edible product into a block comprised of a plurality of sections of different plastic materials arranged in layers, with adjacent sections in each layer and adjacent sections in adjacent layers being of different materials, said apparatus including in combination, means for forming a plurality of layers with each layer being comprised of sections such that adjacent sections are of different plastic materials, means for transporting each layer thus formed to a position remote from where it is formed, and means at such remote position for stacking the layers to form the block independently of forming the layers with each layer being oriented with respect to the other layers such that adjacent sections in adjacent layers are of different materials.

8. Apparatus for forming an edible product into a rectangular block comprised of a plurality of sections of two different plastic materials arranged in layers with adjacent sections in each layer and adjacent sections in adjacent layers being of different materials such that a checkerboard pattern exists in planes parallel to the sides of the block, said apparatus including in combination, means for forming a plurality of layers with each layer being comprised of sections of the different plastic materials arranged in a checkerboard pattern, means for transporting each layer thus formed to a position remote from where it is formed, and means at such remote position for stacking the layers to form the block independently of forming said layers with each layer being oriented with respect to the other layers such that adjacent sections in adjacent layers are of different materials.

9. Apparatus for forming an edible product into a block comprised of a plurality of sections of different plastic materials arranged in layers, with adjacent sections in each layer and adjacent sections in adjacent layers being of different materials, said apparatus including in combination, a plurality of adjacent banks of section forming nozzles for forming layers of plastic materials, means for filling the nozzles in said banks with different plastic materials such that adjacent nozzles are filling with different plastic materials and such that adjacent nozzles in adjacent banks are filled with different plastic materials to form layers wherein adjacent sections are of different materials, means for transporting said banks of nozzles, when filled, to a position remote from where they are filled, and means at such remote position for ejecting the materials from said nozzles to stack the materials in layers to form the block independently of forming the layers wherein adjacent sections are of different materials and with adjacent sections in adjacent layers being of different materials.

10. The combination of claim 9 wherein each bank of nozzles is flexibly secured to the adjacent banks to form an endless belt and wherein said belt is driven in a series of discrete steps.

11. The combination of claim 10 wherein each discrete step in which said endless belt is driven is a different length from the immediately preceding one.

12. The combination of claim 9 wherein said banks of nozzles are disposed in two groups, each group for forming an entire layer, and wherein said means for transporting said banks of nozzles moves each of said two groups of nozzles a different distance from where said nozzles are filled to where they are emptied.

References Cited

UNITED STATES PATENTS

| | | | |
|---|---|---|---|
| 2,713,709 | 7/1955 | Wright | 25—100 |
| 3,122,107 | 2/1964 | Magnusson et al. | 107—15 |

WALTER A. SCHEEL, *Primary Examiner.*

J. SHEA, *Assistant Examiner.*